United States Patent
Kikuta

(10) Patent No.: US 6,352,468 B2
(45) Date of Patent: Mar. 5, 2002

(54) LAPPING METHOD AND METHOD FOR MANUFACTURING LAPPING PARTICLES FOR USE IN THE LAPPING METHOD

(75) Inventor: Kuniko Kikuta, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/848,331

(22) Filed: May 4, 2001

Related U.S. Application Data

(62) Division of application No. 09/280,978, filed on Mar. 30, 1999.

(30) Foreign Application Priority Data

Mar. 30, 1998 (JP) .......................................... 10-083668

(51) Int. Cl.⁷ .................................................. B24B 1/00
(52) U.S. Cl. ........................................ 451/36; 451/28
(58) Field of Search .............................. 451/36, 28, 60, 451/57; 216/89

(56) References Cited

U.S. PATENT DOCUMENTS

| | | | |
|---|---|---|---|
| 3,888,662 A | 6/1975 | Boeckeler | 75/203 |
| 3,932,594 A | 1/1976 | Gortsema | 423/440 |
| 5,520,880 A | 5/1996 | Johnson et al. | 419/45 |
| 5,556,323 A * | 9/1996 | Luther et al. | 451/36 X |
| 5,624,300 A * | 4/1997 | Kishii et al. | 451/36 |
| 5,759,087 A * | 6/1998 | Masumura et al. | 451/36 X |

FOREIGN PATENT DOCUMENTS

| | | |
|---|---|---|
| JP | 4-223852 | 9/1992 |
| JP | 8-003540 | 1/1996 |

* cited by examiner

Primary Examiner—Joseph J. Hail, III
Assistant Examiner—Anthony Ojini
(74) Attorney, Agent, or Firm—Foley & Lardner

(57) ABSTRACT

A method for lapping a material to be lapped is provided, in which the material contacts with a surface of a rotating lapping cloth. A lapping agent containing lapping particles is employed. The lapping particles have a hardness identical or equivalent to that of the material. The hardness is adjusted by controlling a concentration of the lapping particles. A method for manufacturing the lapping particles for use in the lapping method is also provided, in which a silane and an oxygen are injected in a gaseous phase to generate porous silica particles having a desired concentration.

5 Claims, 1 Drawing Sheet

LAPPING METHOD AND METHOD FOR MANUFACTURING LAPPING PARTICLES FOR USE IN THE LAPPING METHOD

This application is a divisional of application Ser. No. 09/280,978 filed. Mar. 30, 1999.

BACKGROUND OF THE INVENTION

1. Field of the Invention

The present invention relates to a method for lapping a material to be lapped such as a semiconductor wafer and also relates to a method for manufacturing lapping particles for use in the lapping method.

2. Description of the Related Art

FIG. 1 shows an example of method for lapping the semiconductor wafer, in which the semiconductor wafer, the material to be lapped, is pressed to contact with a lapping cloth held on a holding table. The lapping cloth is supported on a rotating table not depicted in the figure. Lapping may be performed by rotating the lapping cloth along with supplying a lapping agent onto a lapping cloth surface contacting with the wafer.

The lapping agent is obtained by mixing lapping particles of silica or alumina into a liquid medium and adjusting a particle diameter and pH thereof. In the conventional lapping method, a counter plan for scratches and dishing is essentially achieved by adjusting the hardness of the lapping cloth.

Japanese patent application laid-open No. 04-223852 describes a lapping method based on such the concept. In this known method, the lapping is performed with using a grindstone of a low bonding property type, which contains grindstone particles with a slightly higher hardness than that of the material to be lapped. The method also employs simultaneously other lapping particles with a hardness equivalent to or slightly lower than that of the material to be lapped. A metal oxide such as a chromium oxide, iron oxide, silicon oxide and magnesium oxide and a magnesium carbonate are recommended for use in the lapping particles.

Japanese patent application laid-open No. 08-3540 discloses an example of method for manufacturing lapping particles for use in such the lapping. In this conventional method, the hardness of the lapping particles may be adjusted by emulsion-polymerizing an organic metal compound having a metal-oxygen interatomic bond to form micronized particles of a metal oxide series compound with a relatively lower hardness, and thereafter generating another metal oxide series compound with a relatively higher hardness around the micronized particles.

In case of the material such as an Al-CMP for forming an Al damascene, however, the dishing and scratches may be caused easily because of softness of Al.

In addition, an optimum kind of lapping particles is intentionally adapted to the material, which is selected from various lapping particles by essentially changing the kind thereof. As the hardness of the lapping particles is not adjusted particularly, however, adjusting only the hardness of the lapping cloth can not remove the scratches caused from the lapping particles. This is mainly due to that the hardness of the lapping particles is not adjusted as well as that of the lapping cloth together.

Such the method for manufacturing lapping particles as described in the above-mentioned Japanese patent application laid-open No. 08-3540 may provide lapping particles having a relatively high hardness. However, an adjustable range thereof is limited. With respect to the hardness control, described are the selection of the structure and the like of the organic metal compound to be used as the raw material, and the calcination after the generation thereof. These are directed to increase the hardness of the lapping particles.

An object of the present invention is to provide a lapping method capable of preventing the generation of dishing and scratches.

Another object of the present invention is to provide a method for manufacturing lapping particles suitable for the above lapping method.

SUMMARY OF THE INVENTION

According to the present invention, there is provided a method for lapping the material to be lapped. The method employs a lapping agent containing lapping particles of which concentration is controlled so that the lapping particles may have a hardness identical or equivalent to that of the material.

The lapping particles adaptive for the present invention may include silica particles, metal oxide particles, metal nitride particles and metal carbide particles.

The present invention further provides a method for manufacturing lapping particles. The method may generate porous silica particles having a desired density by injecting a silane and an oxygen in a gaseous phase.

According to another aspect of the present invention, a porous metal oxide, metal nitride or metal carbide having a desired density may be generated by injecting an organic metal compound and an oxygen, nitrogen, carbon or a compound containing such the element in a gaseous phase.

In a preferable aspect of the present invention, the lapping particles may be manufactured by injecting an organic metal gas such as a silane and a dimethyl aluminum hydride from a nozzle at the gaseous phase reaction rate and also injecting an oxygen at the same time from another nozzle both into a vacuum or rare gas ambient of about several mm Torr to several Torr. Porous micronized particles of a silicon or metal oxide may be generated by adjusting the temperature. Thus, the hardness of the silica or metal oxide may be adjusted to be the lapping particles.

Making the silica or alumina lapping particles be porous and adjusting the porous state may control the hardness thereof freely. Therefore, the generation of the scratches can be suppressed efficiently by employing the lapping particles suitable for the hardness of the material to be lapped without changing the liquid medium in accordance with the kind of the lapping particles.

The hardness of the lapping particles is identical or equivalent to that of the material to be lapped. Thus, the scratches due to the extremely higher hardness of the lapping particles than that of the material to be lapped may be effectively suppressed.

Therefore, adjusting the hardness of the lapping particles without changing the liquid medium in use may suppress the lapping scratches down to the minimum even when the same kind of lapping particles is employed.

The hardness of the lapping particles is preferably identical to that of the material to be lapped. However, it is not required to be the very same as that. The anticipated effect may be achieved even when it is substantially identical or equivalent to that. Therefore, the term "substantially identical" herein used in the specification means a range including what is recognized as identical through the general measuring method.

BRIEF DESCRIPTION OF THE DRAWINGS

The present invention will be more fully understood from the following detailed description taken in conjunction with the accompanying drawings in which.

DETAILED DESCRIPTION OF THE INVENTION

Figure 1:
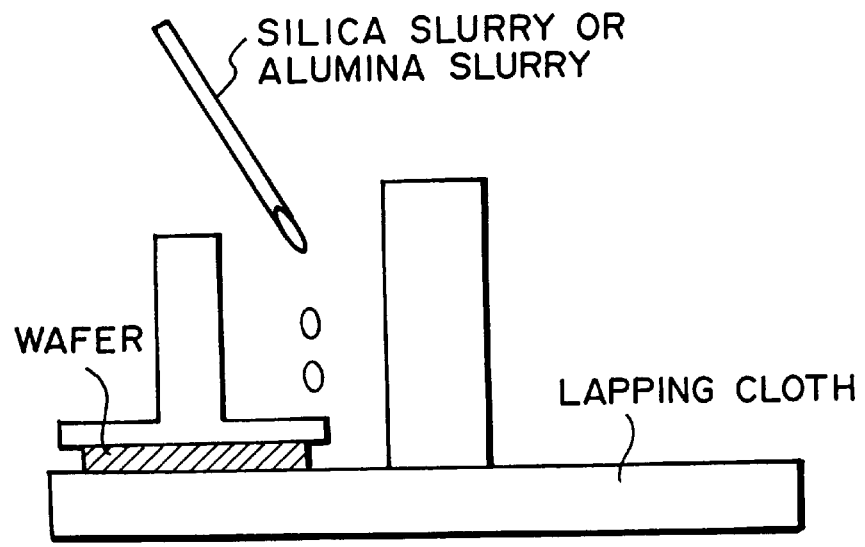
FIG. 1 is a diagram showing the prior art lapping method.
Figure 2:
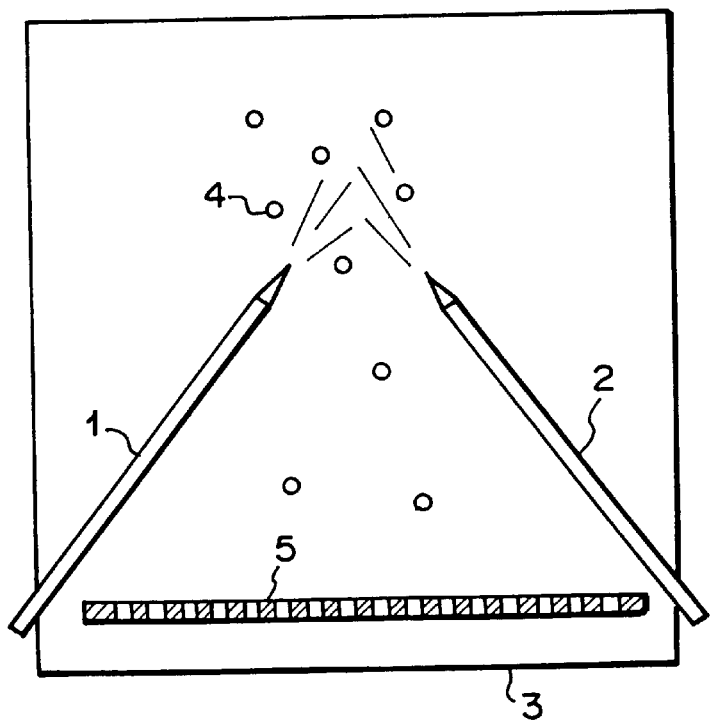
FIG. 2 is a diagram showing a process for manufacturing lapping particles according to the method of the present invention.

A method for forming porous silica particles according to an embodiment of the present invention will be described with reference to FIG. 2.

A silica tube or stainless steel chamber 3 is maintained at a low pressure of several mm Torr to several Torr by means of a mechanical pump and a dry pump (not shown in the figure). The chamber 3 is provided with two nozzles 1 and 2. These nozzles 1 and 2 are equipped with heating devices both capable of heating up to a temperature of 1000° C. (not shown in the figure).

Into the chamber 3, a silane or disilane may be injected through the first nozzle 1 and an oxygen through the second nozzle 2. The injected silane or disilane may react with the injected oxygen in a gaseous phase, resulting silica particles 4.

At the time of the injection, the nozzle 1 may be heated at a temperature ranging from room temperature to 400° C. and the nozzle 2 at a temperature ranging from 400° C. to 1000° C. in order to adjust an oxidizing velocity. A supply pressure of silane or disilane may also be varied within a range between several mm Torr and several Torr in order to adjust a flow rate. Thus, a particle diameter and/or a hardness of the generated silica particles 4 can be controlled accordingly.

The chamber 3 and a dish for receiving the generated particles 4 (not shown in the figure) are disposed close to an exhaust pump, and are preferably maintained at room temperature or less. A filter 5, if necessary, may be arranged between the dish and the nozzles 1–2 to select only those having a range of desired particle diameters among the whole generated particles 4.

The hardness of the particles 4 can be lowered by injecting silane or disilane at a high velocity from the nozzle 1, and at the same time an oxygen gas heated up to a high temperature from the nozzle 2. This is achieved by decreasing a nozzle diameter of nozzle 1 down to an order of 1 to 2 mm and increasing a gas pressure inside the nozzle 1 up to a range from several Torr to several 10 Torr.

Each the nozzles 1 and 2 may be a nozzle of a single bore type, and may also be a nozzle of a shower-head type so long as the gas pressure, the uniformity of the components and the uniformity of the reaction can be maintained.

Moh's hardness of aluminum, silica, alumina and silicon are about 2–2.9, 7, 8 and 7, respectively. In the conventional lapping method, the lapping particles consisting of silica or alumina is mixed with a liquid medium for the use of a lapping agent slurry. The hardness of the material to be lapped is lower than that of the lapping particles of silica or alumina. When lapping the material of aluminum, therefore, the surface of the material may be damaged. In the present invention, the hardness of the lapping particles is controlled to be identical or equivalent to that of the material to be lapped, thus the generation of the scratches can be prevented.

In case of employing the currently used popular silica or alumina as the raw material for constituting the lapping particles, the currently used liquid medium is not required to be changed. To enjoy this advantage, it is required to control the current hardness of silica or alumina so that it can be equivalent to the hardness of the material to be lapped. If the hardness of the lapping particles were higher than the current hardness of silica or alumina, making silica or alumina particles porous and lowering the hardness thereof down to a hardness identical or equivalent to that of the material to be lapped may prevent the scratches.

Other raw materials having controllable hardness include a metal oxide, a metal nitride, a metal carbide and the like.

Another embodiment of the present invention will be described next with respect to a slurry containing a lapping agent that employs lapping particles consisting of a metal nitride (AlN).

In this embodiment, the same apparatus as used in the first embodiment is also employed for producing metal nitride lapping particles having a hardness adjusted to be identical or equivalent to that of the material to be lapped. First, an organic metal compound or dimethyl aluminum hydride, and a carrier gas or a hydrogen are introduced into the first nozzle 1. At this time, a temperature of the nozzle is, for example, 150° C., and all delivery pipes for introducing the gas are preferably heated up to 120–150° C. Dimethyl aluminum hydride may be injected from the nozzle along with the hydrogen carrier gas at a flow rate of several 100 sccm.

On the other hand, a nitride gas such as a nitrogen and an ammonia heated up to a high temperature of 200–1000° C. is injected from the second nozzle 2 at a flow rate substantially equal to that at the nozzle 1. Thus, the organic metal compound or dimethyl aluminum hydride may react with the nitrogen in vacuum. At the reaction time, a relationship between the flow rate of the gas injected from each nozzle and the temperature of the nitrogen or the nitride gas may be selected suitably. Thus, porous metal nitride lapping particles having a hardness identical or equivalent to that of the material to be lapped can be formed. It is apparent to those of ordinary skill in the art that preferable conditions can be easily found through simple experiments.

A hydrocarbon gas such as methylene and ethylene may also be employed as an introducing gas if a metal carbide were used as the lapping particles.

As described above, according to the lapping method of the present invention, since the lapping particles having the hardness identical or equivalent to that of the material to be lapped is employed as those contained in the lapping agent, the scratches caused at the time of lapping the surface of the material to be lapped can be effectively suppressed.

In addition, according to the method for manufacturing lapping particles of the present invention, porous silica particles having a desired density may be generated by injecting silane and oxygen in a gaseous phase. Thus, lapping particles having a desired hardness can be easily produced.

Having described preferred embodiments of the invention it will now become apparent to those of ordinary skill in the art that other embodiments incorporated these concepts may be used. Accordingly, it is submitted that the invention should not be limited to the described embodiments but rather should be limited only by the spirit and scope of the appended claims.

What is claimed is:

1. A method for manufacturing lapping particles, comprising the step of injecting a silane and oxygen in a gaseous phase, wherein porous silica particles having a desired concentration are generated.

2. A method for manufacturing lapping particles, comprising the step of injecting in a gaseous phase:

an organic metal compound; and at least one substance selected from the group consisting of at least one element of oxygen, nitrogen and carbon and a compound containing said element, said organic metal compound and said substance reacting with each other, wherein porous silica particles having a desired concentation are generated.

3. A method according to claim 2, wherein each injection pressure from said nozzles is controlled.

4. A method for manufacturing lapping particles, comprising the steps of:

injecting one of a silane and a disilane into an ambient maintained at a low pressure from a first nozzle, said first nozzle heated up to a temperature ranging from room temperature to 400° C.; and injecting oxygen into said ambient at the same time from a second nozzle, said second nozzle heated up to a temperature ranging from 400° C. to 1000° C., said oxygen reacting with said one of silane and disilane in a gaseous phase, wherein silica particles are generated, and wherein said temperature of said first and second nozzles are controlled to determine a hardness of said silica particles.

5. A method for manufacturing lapping particles, comprising the steps of:

injecting a dimethyl aluminum hydride and a hydrogen carrier gas into an ambient maintained at a low pressure from a first heated nozzle; and injecting a nitrogen or nitride gas into said ambient at the same time from a second nozzle, said second nozzle heated up to a temperature ranging from 200° C. to 1000° C., said dimethyl aluminum hydride and said hydrogen carrier gas reacting with said nitrogen or nitride gas in a gasesous phase, wherein aluminum nitride particles are generated, and wherein said temperatures of said first and second nozzles are controlled to determine a hardness of said aluminum nitride particles.

* * * * *